US009257014B1

(12) United States Patent
Allen et al.

(10) Patent No.: US 9,257,014 B1
(45) Date of Patent: Feb. 9, 2016

(54) EVENTS FOR SELECTED WAGERING GAME MACHINES IN A WAGERING GAME ESTABLISHMENT

(75) Inventors: Jeffrey L. Allen, Naperville, IL (US); Shridhar P. Joshi, Naperville, IL (US); Pamela S. Smith, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 777 days.

(21) Appl. No.: 13/292,839

(22) Filed: Nov. 9, 2011

Related U.S. Application Data

(60) Provisional application No. 61/412,160, filed on Nov. 10, 2010.

(51) Int. Cl.
*A63F 13/00* (2014.01)
*G07F 17/32* (2006.01)

(52) U.S. Cl.
CPC .................................. *G07F 17/3274* (2013.01)

(58) Field of Classification Search
CPC .................................................... G07F 17/3274
USPC ............................................................ 463/42
See application file for complete search history.

(56) References Cited

U.S. PATENT DOCUMENTS

| | | | | |
|---|---|---|---|---|
| 2003/0073494 | A1 * | 4/2003 | Kalpakian et al. | 463/42 |
| 2003/0100360 | A1 * | 5/2003 | Manfredi et al. | 463/25 |
| 2004/0009812 | A1 * | 1/2004 | Scott et al. | 463/28 |
| 2009/0270173 | A1 * | 10/2009 | Christensen | 463/42 |
| 2010/0240455 | A1 * | 9/2010 | Gagner et al. | 463/30 |

* cited by examiner

*Primary Examiner* — Milap Shah
*Assistant Examiner* — Thomas H Henry
(74) *Attorney, Agent, or Firm* — DeLizio Law, PLLC

(57) ABSTRACT

A computerized method includes creating an event associated with a number of wagering game machines in a wagering game establishment, wherein the event is configured to provide an award comprising at least one of better pay tables, a number of free spins, unlocked content, and a jackpot award. The method also includes identifying persons to notify about the event prior to a time of the event. The method includes creating an event notification to notify the persons of the event. The method also includes outputting the event notification to the persons through a network communication using at least one of a social networking website, a micro-blogging website, text messaging, and an email.

35 Claims, 7 Drawing Sheets

2/7

EVENTS FOR SELECTED WAGERING GAME MACHINES IN A WAGERING GAME ESTABLISHMENT

RELATED APPLICATIONS

This application claims the priority benefit of U.S. Provisional Application Ser. No. 61/412,160 filed Nov. 10, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems including events for selected wagering game machines in a wagering game environment.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

Figure 1:
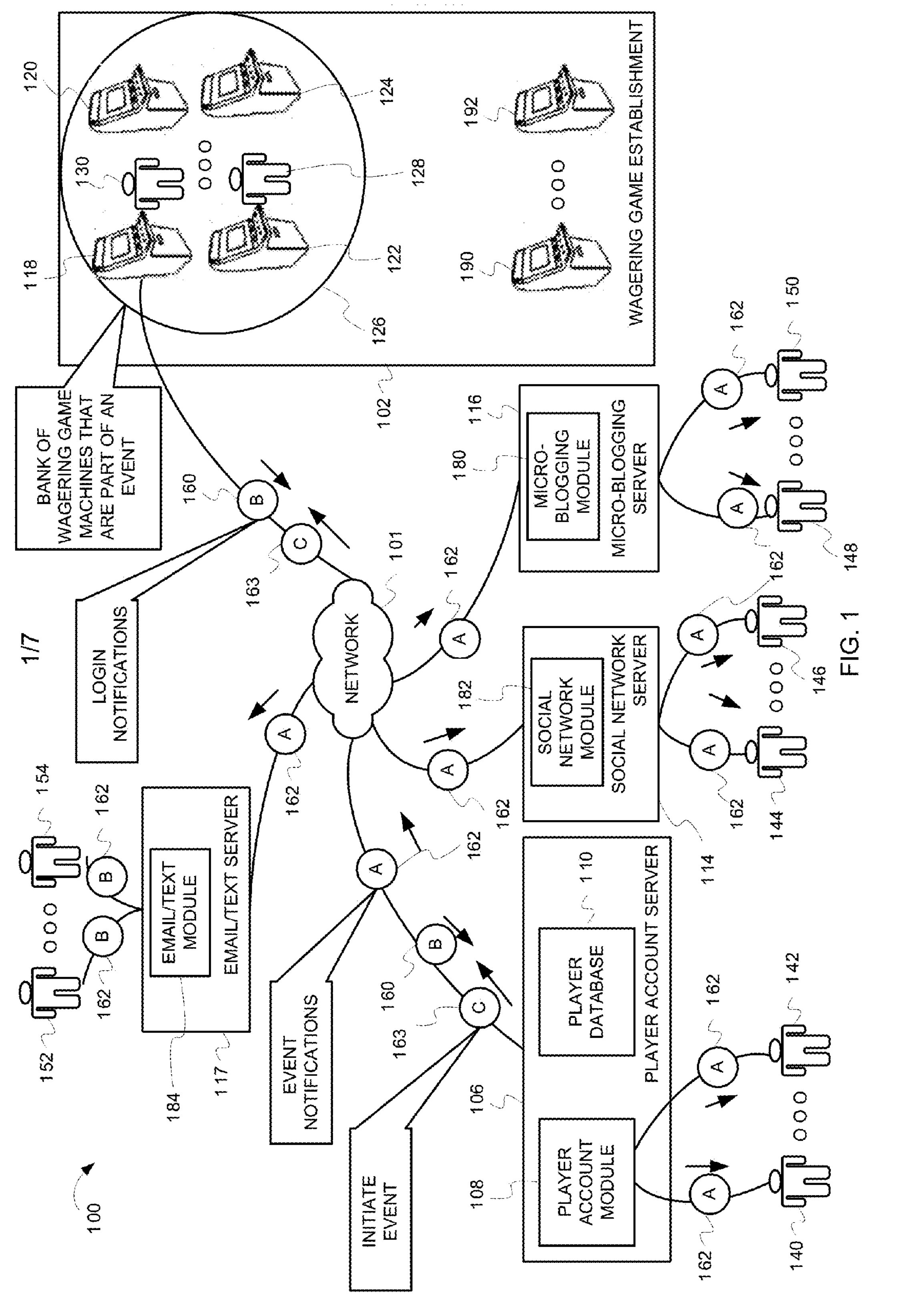
FIG. 1 is a block diagram of a wagering game and event notification system, wherein a minimum number of player logins into the selected wagering game machines are required to start an event, according to some example embodiments.

This description of the embodiments is divided into seven sections. The first section provides an introduction to embodiments of the invention, while the second section describes example operating environments. The third section describes example operations performed by some embodiments. The fourth section describes a wagering game machine architecture, and the fifth section describes a wagering game network. The sixth section describes an example wagering game machine and the seventh section presents some general comments.

INTRODUCTION

This section provides an introduction to some example embodiments. Some example embodiments use various types of network communication to notify persons about events that are occurring or about to occur at a wagering game establishment and that are associated with a selected number of wagering machines therein. The network communication can include an event notification and can be communicated using email communication, text communication, notification through different social networking websites (e.g., Facebook, MySpace, etc.), different micro-blogging websites (e.g., Twitter), players' account website associated with the manufacturer of the wagering game machines or associated with the wagering game establishment, etc. Some example embodiments include time-triggered or entry-triggered events. Also, an event that can span one or more wagering game establishments. In some example embodiments, the operators of the wagering game establishment can create these events. Alternatively or in addition, the manufacturers of the wagering game machines can create these events.

Such events attempt to inspire players to quickly come to the wagering game establishment for wagering game play at these selected number of wagering game machines. The events can include different types of awards to entice players to play the selected number of wagering game machines. The awards can include better pay tables, a number of free spins, unlocked content, a jackpot award, free player points for player accounts etc. For example, players can be given a mathematical advantage to enable higher payouts relative to what is wagered. The event can enable triggering a higher payout with a wagering amount that is less than is typically required for this higher payout. In another example, the event can be set up as a tournament wherein one of the players wins an award (e.g., a jackpot) for being the first player to achieve a certain type of win (e.g., any type of straight in video poker). These events can create a flash mob wherein a large group of people quickly gather at the wagering game establishment.

In some example embodiments, event notifications are sent out to persons that opt to receive such notifications. In some example embodiments, the persons receiving the event notifications can include those persons having specifically opted in to receive these event notifications and having a players account for a particular manufacturer of wagering game machines or a particular wagering game establishment. In some example embodiments, the event notifications include the identification of the wagering game establishment, the identification of the selected wagering game machines therein and the time of the event (e.g., Casino X, Wagering Game Machines having a Theme Y from the manufacturer—WMS Gaming, Inc., from 1-2 pm on Jan. 5, 2011).

In some example embodiments, the event notification can be a broadcast to all persons that have opted to receive such notifications. In some other example embodiments, the event notification can be a narrowcast, wherein only those persons that have opted to receive such notifications and that are within a defined geographical range (10 miles, 5 miles, 1 mile, etc.) relative to the wagering game establishment receive such notifications. In some example embodiments, different location finder applications (e.g., Foursquare, Google Latitude, etc.) on smartphones can be used to determine persons' location relative to the wagering game establishment. Also, the amount of time between the time of the sending of the event notification and the time of the event can vary. In some example embodiments, this amount of time can be very small (one hour, 30 minutes, etc.). In some other example embodiments, this amount of time can be larger (one day, one week, one month, etc.).

In some example embodiments, persons can opt in to receive event notifications based on various criteria. For example, persons can opt in to receive all event notifications. In another example, persons can opt in to receive event notifications regarding specific types of wagering game machines (e.g., wagering game machine with theme X or theme Y) and/or event notifications of events that are occurring in certain ranges of time (e.g., only event notifications between 7 pm-12 am on Friday and Saturday nights). In another example, persons can opt to receive event notifications for specific types of events (e.g., free spins, better pay tables, various hotel and restaurant amenities, etc.). The filtering criteria can be based on one, some or all of these examples. For example, the player can opt to receive for a wagering game machine with theme X on Saturdays from 9 am-12 pm for events that include free spins.

In some example embodiments, the events can be impromptu creations relative to wagering game play of a certain group of wagering game machines. For example, if no or very few players are playing wagering game machines having theme X for a given time period, an event can be created. Accordingly, low wagering game play can create an event that is quickly initiated (e.g., 30 minutes), wherein persons are notified through various applications (described above). In this example, every person that has opted in and that is within 30 minute driving distance is notified. Such an event can pull players from other wagering game machines in a same or different wagering game establishment, persons shopping or dining nearby, etc.

Event notifications can become viral. For example, in some example embodiments, different criteria must be met prior to start of the event. In particular, an event can be initiated based on different criteria (e.g., number of players logged into their account on certain wagering game machines, a certain level of money deposited for wagering game play on certain wagering game machines in a defined time period, etc.). For example, assume 100 players are required to be logged into their account on 100 different wagering game machines for a specific manufacturer. Event notifications can then become viral because persons have an incentive to forward to other persons so that the criteria is met to start the event. Accordingly, the persons can forward the event notifications to other persons, who can forward to other persons, etc. in order to meet the criteria to trigger the event.

In some example embodiments, in response to a player logging into their player account as part of an event, a message can be forwarded to the person's account on a social network website and/or a micro-blogging website. Such message can be included in the stream for the person's account on these different websites. Also, such messages can provide specific information about the event. If the event requires a certain trigger criteria, such information can be included in the message. For example, a message can indicate that 15 more people are needed to log into their accounts for specific wagering game machines at a specific wagering game establishment to trigger 50 free spins for each of the players. In some example embodiments, a player account website can provide some type of meter to indicate how much remains for a given criteria before the event is initiated. Alternatively or in addition, additional event notifications can be sent out to persons that have opted in but not yet logged into their account on one of the selected wagering game machines. These additional event notifications could also provide some type of meter to indicate how much remains for a given criteria before the event is initiated (e.g., 10 more players are needed). Additionally, players that are logged into one of the specific wagering game machines can be notified (e.g., pop-up window on the machine, text or email message, etc.) that indicate how much remains for a given criteria before the event is initiated. Such notifications can provide incentives to these players to contact their friends, family, etc. to come be a part of the event (e.g., texting, emails, telephone calls, etc.).

In some example embodiments, an event can be for a long period of time (e.g., one week), wherein awards are provided to players depending on when they were part of the event. For example, the first 100 players receive double payouts for the first 100 games, the second 100 players receive 10 free spins, etc.

In some example embodiments, the awards for participating in an event can vary among players based on their player profile. For example, if player X has been wagering beyond a minimum monetary amount for a given time period (e.g., last six months), the player X receives a greater award relative to player Y who has not. In another example, if player X has played a particular type of wagering game machine previously, the player X receives a greater award relative to player Y who has not. To illustrate, player X would receive 50 free spins, while player Y would receive 10 free spins.

In some example embodiments, the initiation of the event can affect the environment provided around the selected wagering game machines. For example, these wagering game machines can output different audio, additional lighting, different signage, etc. once the event is started. Persons watching the wagering game machines can be informed (e.g., audio output) of the event and provided an incentive to join. For example, the audio can indicate that the next 10 persons to join one of the selected wagering game machines will be given the same incentive or additional incentives as the current players.

In some example embodiments, only selected players receive the event notifications. These players can be selected based on various criteria. For example, only players that have wagered a given monetary amount over a given time period are selected (e.g., $1000 over the last year). These selected players can forward these event notifications to other persons. Accordingly, these players serve as connectors to enable other persons to be part of the events.

In some example embodiments, events can be part of a rollout of a new type of wagering game machine across any number of wagering game establishments. For example, an event can be associated with a newly themed wagering game machine that is placed across numerous wagering game establishments (e.g., citywide, statewide, nationally, globally, etc.).

Operating Environment

This section describes an example operating environment and presents structural aspects of some embodiments. This section includes discussion about wagering game machine architectures and wagering game networks for events related to selected wagering game machines in a wagering game environment.

Figure 2:
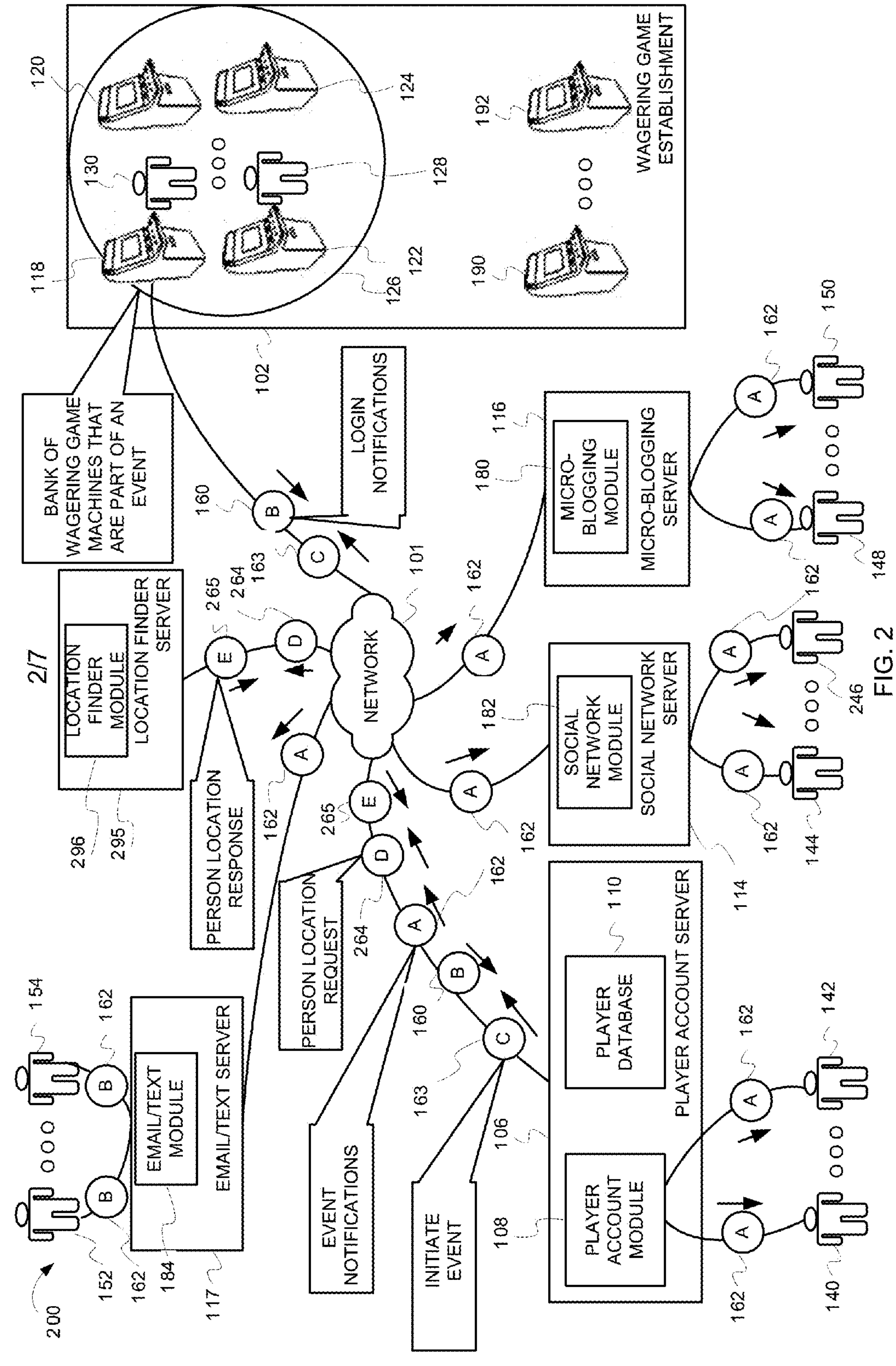
FIG. 2 is a block diagram of a wagering game and event notification system, wherein only persons in a defined geographical range relative to the wagering game establishment are notified, according to some example embodiments.

This section describes FIGS. 1 and 2. The discussion of FIG. 1 describes events, wherein a minimum number of player logins into the selected wagering game machines are required to start the event. The discussion of FIG. 2 describes events, wherein persons within a defined geographical range relative to the wagering game establishment are invited to the event. While described separately, these two different systems can be combined. In particular, some example embodiments can include an event requiring a minimum number of player logins into the selected wagering game machines to start, wherein persons within a defined geographical range relative to the wagering game establishment are invited to the event. Also, some example embodiments do not require either a minimum number of player logins into the selected wagering game machines to start the event or event notifications only to persons within a defined geographical range relative to the wagering game establishment. For example, some example embodiments can include an event that is triggered at some specific time (not triggered based on number of player logins), wherein persons are invited to the event independent of their geographical range relative to the wagering game establishment. Also, while described relative to one wagering game establishment, some example embodiments can include any number of wagering game establishments.

FIG. 1 is a block diagram of a wagering game and event notification system, wherein a minimum number of player logins into the selected wagering game machines are required to start an event, according to some example embodiments. FIG. 1 includes a system 100 that includes a wagering game establishment 102, a player account server 106, a social network website 114, a micro-blogging website 116, and an email/text server 117 that are communicatively coupled together through a network 101. The player account server 106 includes a player account module 108 and a player database 110. The social network server 114 includes a social network module 182. The micro-blogging server 116 includes a micro-blogging module 180. The email/text server 117 includes an email/text module 184. The player account module 108, the social network module 182, the micro-blogging module 180, and the email/text module 184 can be software, firmware, hardware or a combination thereof. While described such that different servers are hosting different modules, in some other example embodiments, one server can host multiple modules. For example, a same server can host the email/text module 184 and the social network module 182.

The player database 110 can be stored in any type of nonvolatile machine-readable medium and include account information for players having accounts. In this example, the accounts are associated with a specific manufacturer of wagering game machines. In another example, the accounts can be associated with a specific wagering game establishment. The player account information can include various types of player tracking information that enables players to obtain reward points, trophies, etc. based on their wagering game play at wagering game machines. These reward points can be redeemed for free spins at wagering game machines, free or discounted hotel or restaurant amenities, etc. Accordingly, as a player is playing a wagering game machine, their wagering game play can be transmitted over the network 101 for storage in the player database 110.

The wagering game establishment 102 includes a number of wagering game machines. In this example, the wagering game establishment 102 includes a wagering game machine 118, a wagering game machine 120, a wagering game machine 122, a wagering game machine 124, a wagering game machine 190, and a wagering game machine 192. The group of wagering game machines 118-124 is representative of any number of wagering game machines. Similarly, the group of wagering game machines 190-192 is representative of any number of wagering game machines. In this example, the wagering game machines 118-124 are part of a bank of wagering game machines that are part of an event—a bank 126. The wagering game machines 190-192 are not part of this event. Although not shown, the wagering game machines 118-124 and the wagering game machines 190-192 are communicatively coupled to the network 101.

In this example, a number of different persons are interacting with the system 100. A group of persons 140-142 are communicating with the player account module 108. A group of persons 144-146 are communicating with the social network module 182. A group of persons 148-150 are communicating with the micro-blogging module 180. A group of persons 152-154 are communicating with the email/text module 184. Each of these different groups of persons is representative of any number of persons. Also, while shown such that one person is only communicating with one particular module, in some example embodiments, a same person can be communicating with multiple modules. For example, the person 144 can be communicating with the social network module 182 and the micro-blogging module 180. Also in this example, a player 130 is wagering at the wagering game machine 118, and a player 128 is wagering at the wagering game machine 122.

In some example embodiments, the player account module 108 creates and controls the events that are occurring at the selected wagering game machines in the wagering game establishment 102—the wagering game machines 118-124. The player account module 108 can create an event based on instructions from the manufacturer of wagering game machines or an operator of the wagering game establishment 102. The events can be defined relative to a specific time, based on certain triggering mechanisms, at selected wagering game machines, at selected wagering game establishments, for specific persons, having specific awards, etc. The awards can include better pay tables, a number of free spins, unlocked content, a jackpot award, etc. These events can create a flash mob wherein a large group of people quickly gather at the wagering game establishment.

In some example embodiments, the events can be impromptu creations relative to wagering game play of a certain group of wagering game machines. For example, if no or very few players are playing wagering game machines having theme X for a given time period, an event can be created. In some other example embodiments, the events can be more planned. For example, the event can be part of a rollout of a new type of wagering game machine across any number of wagering game establishments.

The player account module 108 determines which persons are to receive the event notifications. In some example embodiments, every person that is in the player database 110 receives the event notification. In some other example embodiments, every person that is in the player database 110 that has opted to receive event notifications receives the event notifications. In some example embodiments, persons can opt in to receive event notifications based on various criteria. For example, persons can opt in to receive all event notifications. In another example, persons can opt in to receive event notifications regarding specific types of wagering game machines (e.g., wagering game machine with theme X or theme Y) and/or event notifications of events that are occurring in certain ranges of time (e.g., only event notifications between 7 pm-12 am on Friday and Saturday nights). In another example, persons can opt to receive event notifications for specific types of events (e.g., free spins, better pay tables, various hotel and restaurant amenities, etc.). The filtering criteria can be based on any or all of these examples. For example, the player can opt to receive for a wagering game machine with theme X on Saturdays from 9 am-12 pm for events that include free spins.

The player account module 108 can send the event notifications 162 to persons using any of a number of different applications. The player account module 108 can send the event notifications 162 at different times prior to the start of the event. For example, the player account module 108 can send out the event notifications 162 just prior to the event (e.g., 30 minutes, one hour, etc.) or much earlier (e.g., one day, one week, one month, etc.). Also, the player account module 108 can send out multiple event notifications 162 to a same player at different times. For example in this configuration in FIG. 1, the event is initiated after a minimum number of players login to their accounts on selected wagering game machines. Accordingly, the player account module 108 can send an initial event notification 162 to all the persons that are designated to receive. The player account module 108 can then send updated event notifications 162 has the event is closer to being triggered. For example, a second event notification can indicate that 10 more players are needed to start the event, a third event notification can indicate that five more players are needed to start the event, etc.

With reference to FIG. 1, the player account module 108 can send the event notifications 162 using different applications. In the system 100, the player account module 108 can send the event notifications 162 using a social network application (e.g., Facebook, MySpace, etc.)—shown as the social network module 182; a micro-blogging application (e.g., Twitter)—shown as the micro-blogging module 180, and an email/text application—shown as the email/text module 184. The communications can be wired or wireless to different type of user devices (either mobile or non-mobile). For example, the communications can be sent to the persons' smartphones. Also, the player account module 108 can directly communicate with the persons. For example, the player account module 108 can communicate the persons by sending the notifications to the players' accounts. Accordingly, the players can receive such notifications after they are logged in their account.

In FIG. 1, the player account module 108 transmits the event notification 162 directly to the persons 140-142. The social network module 182 receives the event notification 162 and forwards the event notification 162 to the persons 144-146. The micro-blogging module 180 receives the event notification 162 and forwards the event notification 162 to the persons 148-150. The email/text module 184 receives the event notification 162 and forwards the event notification 162 to the persons 152-154.

In this example of FIG. 1, the event is triggered after a minimum number of players have logged into their account at selected wagering game machines (the wagering game machines 118-124) at the wagering game establishment 102. The players can login by inserting a magnetic-striped card into the wagering game machine, inputting a username/password, etc. After a player logs into their account a login notification 160 is transmitted from the wagering game machine over the network 101 to the player account module 108. Accordingly, starting at a certain time (e.g., 2 pm on Friday), the player account module 108 can begin tracking how many players have logged into the wagering game machines 118-124—based on the login notifications 160. After the minimum number of players have logged in, the event can be initiated. In particular, the player account module 108 can transmit an initiate event message 163 over the network 101 to the selected wagering game machines 118-124. The initiate event message 163 can include instructions about the award to be provided to the players. For example, the instructions can include instructions to credit X number of free spins to the players, instructions to adjust the pay tables, instructions to unlock certain content, instructions to enable a tournament wherein a jackpot is awarded to the first player to achieve a certain type of win (e.g., four of a kind on video poker), etc. The wagering game machines 118-124 adjust their operations in accordance with these instructions. Also, the player account module 108 can send a termination message after the event is over to the wagering game machines 118-124. Accordingly, the wagering game machines 118-124 can return to their previous states (e.g., original pay tables, etc.).

FIG. 2 is a block diagram of a wagering game and event notification system, wherein only persons in a defined geographical range relative to the wagering game establishment are notified, according to some example embodiments. FIG. 2 includes a number of the same components that are included in FIG. 1. Accordingly, a same reference number is used in both FIGS. 1 and 2. For example, the player account server 106 is the same for both FIGS. 1 and 2. Therefore, the description of FIG. 2 will not reiterate the description of these same components and their operations. The description of a system 200 of FIG. 2 includes a description of the additional components and operations relative to the system 100 of FIG. 1.

The additional components of the system 200 (relative to the system 100) involve person tracking to identify persons in a defined geographic range relative to the wagering game establishment 102. These identified persons are the only ones to receive the event notifications from the player account module 108. The additional components of the system 200 include a location finder server 295 that includes a location finder module 296. The location finder module 296 can be software, firmware, hardware or a combination thereof. Examples of the location finder module 296 include Foursquare, Google Latitude, etc. As described above while described such that different servers are hosting different modules, in some other example embodiments, one server can host multiple modules. For example, a same server can host the email/text module 184 and the location finder module 296.

In this example, as part of the identification of the persons to receive the event notification (see description of FIG. 1 above), the player account module 108 also sends a person location request 264 over the network 101 to the location finder module 296. As described above, the location finder module 206 can communicate with persons' devices (e.g., smartphone) to determine their location. For example, the mobile devices can include a Global Positioning System (GPS) module to provide its location. The devices of all persons requested by the player account module 108 are queried to determine their location. Alternatively or in addition, the player account module 108 or the location finder module 206 can query a database of home or business addresses for persons. The player account module 108 can then output event notifications of persons who have opted in and who live and/or work within the defined geographical range. In some example embodiments, the player account module 108 requests the locations of all persons in the player database 110. In some other example embodiments, the player account module 108 filters on various criteria to determine which persons are opting to receive the event notifications. The player account module 108 can then send a request for the locations of only those persons that are opting to receive. For example, persons can opt in to receive event notifications regarding specific types of wagering game machines (e.g., wagering game machine with theme X or theme Y) and/or event notifications of events that are occurring in certain ranges of time (e.g., only event notifications between 7 pm-12 am on Friday and Saturday nights). In another example, persons can opt to receive event notifications for specific types of events (e.g., free spins, better pay tables, various hotel and restaurant amenities, etc.). The filtering criteria can be based on any or all of these examples. For example, the player can opt to receive for a wagering game machine with theme X on Saturdays from 9 am-12 pm for events that include free spins. Accordingly, the player account module 108 can request the location of these particular persons.

In response, the location finder module 296 can query the locations of the mobile devices of these particular persons. The location finder module 296 can then provide the locations of these particular persons to the player account module 108—see person location response 265. The player account module 108 can then determine which of these particular persons are within a defined geographic range. The defined geographic range can be based on a number of different criteria. For example, if the event is to occur very quickly relative to the sending out of the event locations, the player account module 108 can identify those persons that are close to the wagering game establishment 102. For example, if the time difference between the sending of the event notification and the event is 30 minutes, the player account module 108 can limit the persons to receive the event notification to those persons within 30 miles. The player account module 108 can send the event notifications 162 using different applications to these persons that are within the defined geographic range (see description of FIG. 1 regarding the sending of the event notifications 162). Also, the player account module 108 can initiate an event (163) based on a specific time, a trigger event as described in FIG. 1, etc.

Example Operations

This section describes operations associated with some embodiments of the invention. In the discussion below, the flowcharts will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flowchart.

Figure 3:
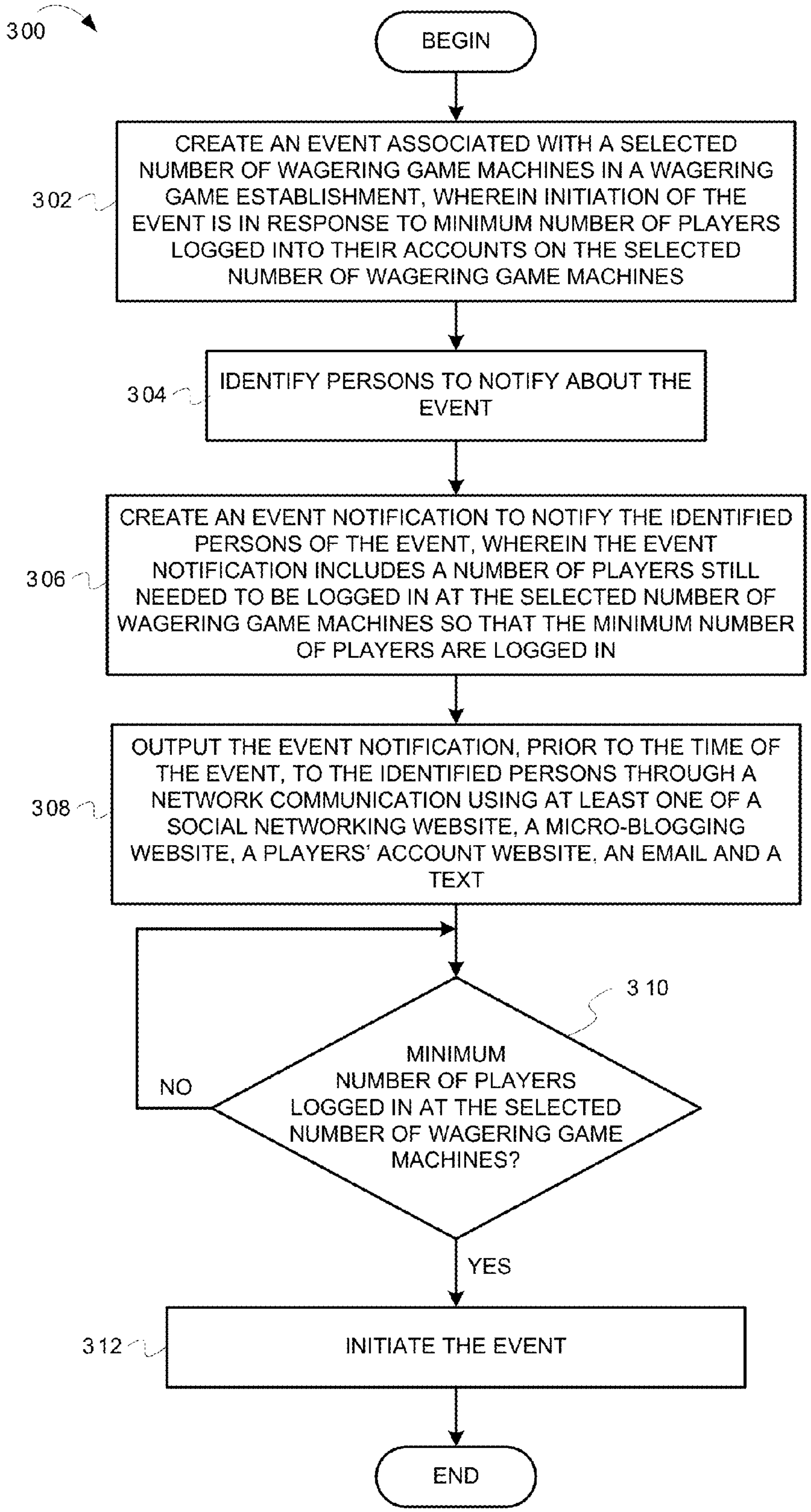
FIG. 3 is a flowchart of operations for creating events for selected wagering game machines, wherein a minimum number of player logins into the selected wagering game machines are required to start an event, according to some example embodiments.
Figure 4:
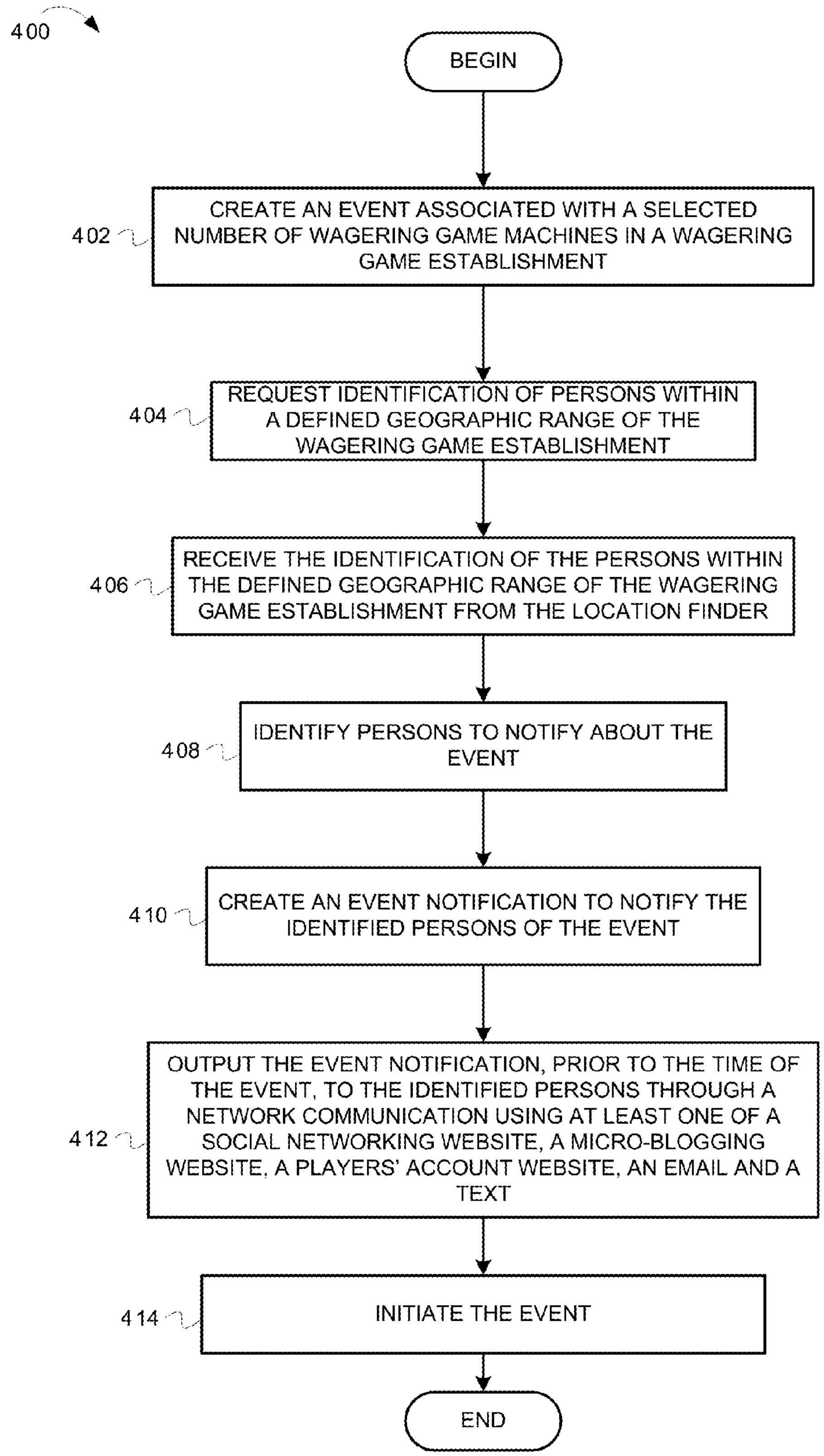
FIG. 4 is a flowchart of operations for creating events for selected wagering game machines, wherein only persons in a defined geographical range relative to the wagering game establishment are notified of the event, according to some example embodiments.

This section provides discussion of different flowcharts for creating events for selected wagering game machines in a wagering game establishment. The section will discuss FIGS. 3-4. The discussion of FIG. 3 will describe operations for creating events for selected wagering game machines, wherein a minimum number of player logins into the selected wagering game machines are required to start an event. The flowchart of FIG. 3 is described with reference to the system 100 of FIG. 1. The discussion of FIG. 4 will describe operations for creating events for selected wagering game machines, wherein only persons in a defined geographical range relative to the wagering game establishment are notified of the event. The flowchart of FIG. 4 is described with reference to the system 200 of FIG. 2. While the operations of the flowcharts of FIGS. 3 and 4 are described separately, in some example embodiments, the operations can be performed together. For example, an event can be initiated after a minimum number of players are logged into the selected wagering game machines, wherein only persons in a defined geographical range relative to the wagering game establishment are notified of the event.

FIG. 3 is a flowchart of operations for creating events for selected wagering game machines, wherein a minimum number of player logins into the selected wagering game machines are required to start an event, according to some example embodiments. In some example embodiments, the operations of a flowchart 300 are performed by the player account module 108 in the player account server 106 of FIG. 1. The operations of the flowchart 300 begin at block 302.

At block 302, the player account module 108 creates an event associated with a selected number of wagering game machines in a wagering game establishment, wherein initiation of the event is in response to having a minimum number of players logged into their account on the selected wagering game machines. With reference to FIG. 1, the player account module 108 creates an event for the wagering game machines 118-124 in the wagering game establishment 102. The player account module 108 can create an event based on instructions from the manufacturer of wagering game machines or an operator of the wagering game establishment 102. The events can be defined relative to a specific time, based on certain triggering mechanisms, at selected wagering game machines, at selected wagering game establishments, for specific persons, having specific awards, etc. The awards can include better pay tables, a number of free spins, unlocked content, a jackpot award, etc. These events can create a flash mob wherein a large group of people quickly gather at the wagering game establishment. In some example embodiments, the events can be impromptu creations relative to wagering game play of a certain group of wagering game machines. For example, if no or very few players are playing wagering game machines having theme X for a given time period, an event can be created. In some other example embodiments, the events can be more planned. For example, the event can be part of a rollout of a new type of wagering game machine across any number of wagering game establishments. The operations of the flowchart 300 continue at block 304.

At block 304, the player account module 108 identifies persons to notify about the event. With reference to FIG. 1 in some example embodiments, every person that is in the player database 110 receives the event notification. In some other example embodiments, every person that is in the player database 110 that has opted to receive event notifications receives the event notifications. In some example embodiments, persons can opt in to receive event notifications based on various criteria. For example, persons can opt in to receive all event notifications. In another example, persons can opt in to receive event notifications regarding specific types of wagering game machines (e.g., wagering game machine with theme X or theme Y) and/or event notifications of events that are occurring in certain ranges of time (e.g., only event notifications between 7 pm-12 am on Friday and Saturday nights). In another example, persons can opt to receive event notifications for specific types of events (e.g., free spins, better pay tables, various hotel and restaurant amenities, etc.). The filtering criteria can be based on any or all of these examples. For example, the player can opt to receive for a wagering game machine with theme X on Saturdays from 9 am-12 pm for events that include free spins. Accordingly, the player account module 108 can identify persons to notify about the event using a number of different techniques. The operations of the flowchart 300 continue at block 306.

At block 306, the player account module 108 creates an event notification to notify the identified persons about the event. The event notification can include the date and time of the event, the identification of the wagering game establishment, and the identification of the selected wagering game machines. In this example, the event notification also includes the event triggering requirement—the number of players that need to be logged in at the selected wagering game machines so that the minimum number of players is logged in to trigger the event. For example, an initial event notification can include the minimum number of players needed. Subsequent event notifications can include the remaining number of players needed. The operations of the flowchart 300 continue at block 308.

At block 308, the player account module 108 outputs the event notification, prior to the time of the event, to the identified persons through a network communication, using at least one of a social networking website, a micro-blogging website, a player's account website, an email and a text. With reference to FIG. 1, the player account module 108 can send the event notifications 162 using different applications. In the system 100, the player account module 108 can send the event notifications 162 using a social network application (e.g., Facebook, MySpace, etc.)—shown as the social network module 182; a micro-blogging application (e.g., Twitter)—shown as the micro-blogging module 180, an email/text application—shown as the email/text module 184. The communications can be wired or wireless to different type of user devices (either mobile or non-mobile). For example, the communications can be sent to the persons' smartphones. Also, the player account module 108 can directly communicate with the persons. For example, the player account module 108 can communicate the persons by sending the notifications to the players' accounts. Accordingly, the players can receive such notifications after they are logged in their account. In FIG. 1, the player account module 108 is transmitted the event notification 162 directly to the persons 140-142. The social network module 182 receives the event notification 162 and forwards the event notification 162 to the persons 144-146. The micro-blogging module 180 receives the event notification 162 and forwards the event notification 162 to the persons 148-150. The email/text module 184 receives the event notification 162 and forwards the event notification 162 to the persons 152-154. Also with reference to FIG. 1, the player account module 108 can send the event notifications 162 at different times prior to the start of the event. For example, the player account module 108 can send out the event notifications 162 just prior to the event (e.g., 30 minutes, one hour, etc.) or much earlier (e.g., one day, one week, one month, etc.). Also, the player account module 108 can send out multiple event notifications 162 to a same player at different times. For example in this configuration in FIG. 1, the event is initiated after a minimum number of players login to their accounts on selected wagering game machines. Accordingly, the player account module 108 can send an initial event notification 162 to all the persons that are designated to receive. The player account module 108 can then send updated event notifications 162 has the event is closer to being triggered. For example, a second event notification can indicate that 10 more players are needed to start the event, a third event notification can indicate that five more players are needed to start the event, etc. The operations of the flowchart 300 continue at block 310.

At block 310, the player account module 108 determines whether the minimum number of players is logged in at the selected number of wagering game machines. The players can login by inserting a magnetic-striped card into the wagering game machine, inputting a username/password, etc. With reference to FIG. 1, after a player logs into their account a login notification 160 is transmitted from the wagering game machine over the network 101 to the player account module 108. Accordingly, starting at a certain time (e.g., 2 pm on Friday), the player account module 108 can begin tracking how many players have logged into the wagering game machines 118-124—based on the login notifications 160. After the minimum number of players have logged in, the event can be initiated. If the minimum number of players have not logged into the selected number of wagering game machines, the operations remain at block 310, where this determination is again made. Otherwise, the operations of the flowchart 300 continue at block 312. In some example embodiments, additional event notifications can be sent out to the identified persons and/or the players already logged in order to meet this minimum requirement (as described above).

At block 312, the player account module 108 initiates the event. With reference to FIG. 1, the player account module 108 can transmit an initiate event message 163 over the network 101 to the selected wagering game machines 118-124. The initiate event message 163 can include instructions about the award to be provided to the players. For example, the instructions can include instructions to credit X number of free spins to the player, instructions to adjust the pay tables, instructions to unlock certain content, instructions to enable a tournament wherein a jackpot is awarded to the first player to achieve a certain type of win (e.g., four of a kind on video poker), etc. The wagering game machines 118-124 adjust their operations in accordance with these instructions. Also, the player account module 108 can send a termination message after the event is over to the wagering game machines 118-124. Accordingly, the wagering game machines 118-124 can return to their previous states (e.g., original pay tables, etc.). The operations of the flowchart 300 are complete.

FIG. 4 is a flowchart of operations for creating events for selected wagering game machines, wherein only persons in a defined geographical range relative to the wagering game establishment are notified of the event, according to some example embodiments. In some example embodiments, the operations of a flowchart 400 are performed by the player account module 108 in the player account server 106 of FIG. 2. The operations of the flowchart 400 begin at block 402.

At block 402, the player account module 108 creates an event associated with a selected number of wagering game machines in a wagering game establishment. With reference to FIG. 2, the player account module 108 creates an event for the wagering game machines 118-124 in the wagering game establishment 102. The player account module 108 can create an event based on instructions from the manufacturer of wagering game machines or an operator of the wagering game establishment 102. The events can be defined relative to a specific time, based on certain triggering mechanisms, at selected wagering game machines, at selected wagering game establishments, for specific persons, having specific awards, etc. The awards can include better pay tables, a number of free spins, unlocked content, a jackpot award, etc. These events can create a flash mob wherein a large group of people quickly gather at the wagering game establishment. In some example embodiments, the events can be impromptu creations relative to wagering game play of a certain group of wagering game machines. For example, if no or very few players are playing wagering game machines having theme X for a given time period, an event can be created. In some other example embodiments, the events can be more planned. For example, the event can be part of a rollout of a new type of wagering game machine across any number of wagering game establishments. The operations of the flowchart 400 continue at block 404.

At block 404, the player account module 108 request identification of persons within a defined geographic range of the wagering game establishment. With reference to FIG. 2, the player account module 108 sends a person location request 264 over the network 101 to the location finder module 296. As described above, the location finder module 206 can communicate with persons' mobile devices to determine their location. For example, the mobile devices can include a Global Positioning System (GPS) module to provide its location. The mobile devices of all persons requested by the player account module 108 are queried to determine their location. In some example embodiments, the player account module 108 requests the locations of all persons in the player database 110. In some other example embodiments, the player account module 108 filters on various criteria to determine which persons are opting to receive the event notifications. The player account module 108 can then send a request for the locations of only those persons that are opting to receive. For example, persons can opt in to receive event notifications regarding specific types of wagering game machines (e.g., wagering game machine with theme X or theme Y) and/or event notifications of events that are occurring in certain ranges of time (e.g., only event notifications between 7 pm-12 am on Friday and Saturday nights). In another example, persons can opt to receive event notifications for specific types of events (e.g., free spins, better pay tables, various hotel and restaurant amenities, etc.). The filtering criteria can be based on any or all of these examples. For example, the player can opt to receive for a wagering game machine with theme X on Saturdays from 9 am-12 pm for events that include free spins. Accordingly, the player account module 108 can request the location of these particular persons. The operations of the flowchart 400 continue at block 406.

At block 406, the player account module 108 receives the identification of the persons within the defined geographic range of the wagering game establishment from the location finder. In particular, the location finder module 296 can query the locations of the mobile devices of these particular persons whose location is needed. The location finder module 296 can then provide the locations of these particular persons to the player account module 108—see person location response 265. The operations of the flowchart 400 continue at block 408.

At block 408, the player account module 108 identifies persons to notify about the event. In particular, the player account module 108 can then determine which of these particular persons are within a defined geographic range. The defined geographic range can be on a number of different criteria. For example, if the event is to occur very quickly relative to the sending out of the event locations, the player account module 108 can identify those persons that are close to the wagering game establishment 102. For example, if the time difference between the sending of the event notification and the event is 30 minutes, the player account module 108 can limit the persons to receive the event notification to those persons within 30 miles. The operations of the flowchart 400 continue at block 410.

At block 410, the player account module 108 creates an event notification to notify the identified persons about the event. The event notification can include the date and time of the event, the identification of the wagering game establishment, and the identification of the selected wagering game machines. In some example embodiments, the event notification also includes the event triggering requirement (e.g., the number of players that need to be logged in at the selected wagering game machines so that the minimum number of players is logged in to trigger the event). The operations of the flowchart 400 continue at block 412.

At block 412, the player account module 108 outputs the event notification, prior to the time of the event, to the identified persons through a network communication, using at least one of a social networking website, a micro-blogging website, a player's account website, an email and a text. With reference to FIG. 2, the player account module 108 can send the event notifications 162 using different applications. In the system 100, the player account module 108 can send the event notifications 162 using a social network application (e.g., Facebook, MySpace, etc.)—shown as the social network module 182; a micro-blogging application (e.g., Twitter)—shown as the micro-blogging module 180, an email/text application—shown as the email/text module 184. The communications can be wired or wireless to different type of user devices (either mobile or non-mobile).

For example, the communications can be sent to the persons' smartphones. Also, the player account module 108 can directly communicate with the persons. For example, the player account module 108 can communicate the persons by sending the notifications to the players' accounts. Accordingly, the players can receive such notifications after they are logged in their account. In FIG. 2, the player account module 108 is transmitted the event notification 162 directly to the persons 140-142. The social network module 182 receives the event notification 162 and forwards the event notification 162 to the persons 144-146. The micro-blogging module 180 receives the event notification 162 and forwards the event notification 162 to the persons 148-150. The email/text module 184 receives the event notification 162 and forwards the event notification 162 to the persons 152-154. Also with reference to FIG. 1, the player account module 108 can send the event notifications 162 at different times prior to the start of the event. For example, the player account module 108 can send out the event notifications 162 just prior to the event (e.g., 30 minutes, one hour, etc.) or much earlier (e.g., one day, one week, one month, etc.). Also, the player account module 108 can send out multiple event notifications 162 to a same player at different times (as described above). The operations of the flowchart 400 continue at block 414.

At block 414, the player account module 108 initiates the event. With reference to FIG. 2, the player account module 108 can transmit an initiate event message 163 over the network 101 to the selected wagering game machines 118-124. The initiate event message 163 can include instructions about the award to be provided to the players. For example, the instructions can include instructions to credit X number of free spins to the player, instructions to adjust the pay tables, instructions to unlock certain content, instructions to enable a tournament wherein a jackpot is awarded to the first player to achieve a certain type of win (e.g., four of a kind on video poker), etc. The wagering game machines 118-124 adjust their operations in accordance with these instructions. Also, the player account module 108 can send a termination message after the event is over to the wagering game machines 118-124. Accordingly, the wagering game machines 118-124 can return to their previous states (e.g., original pay tables, etc.). The operations of the flowchart 400 are complete.

Wagering Game Machine Architecture

Figure 5:
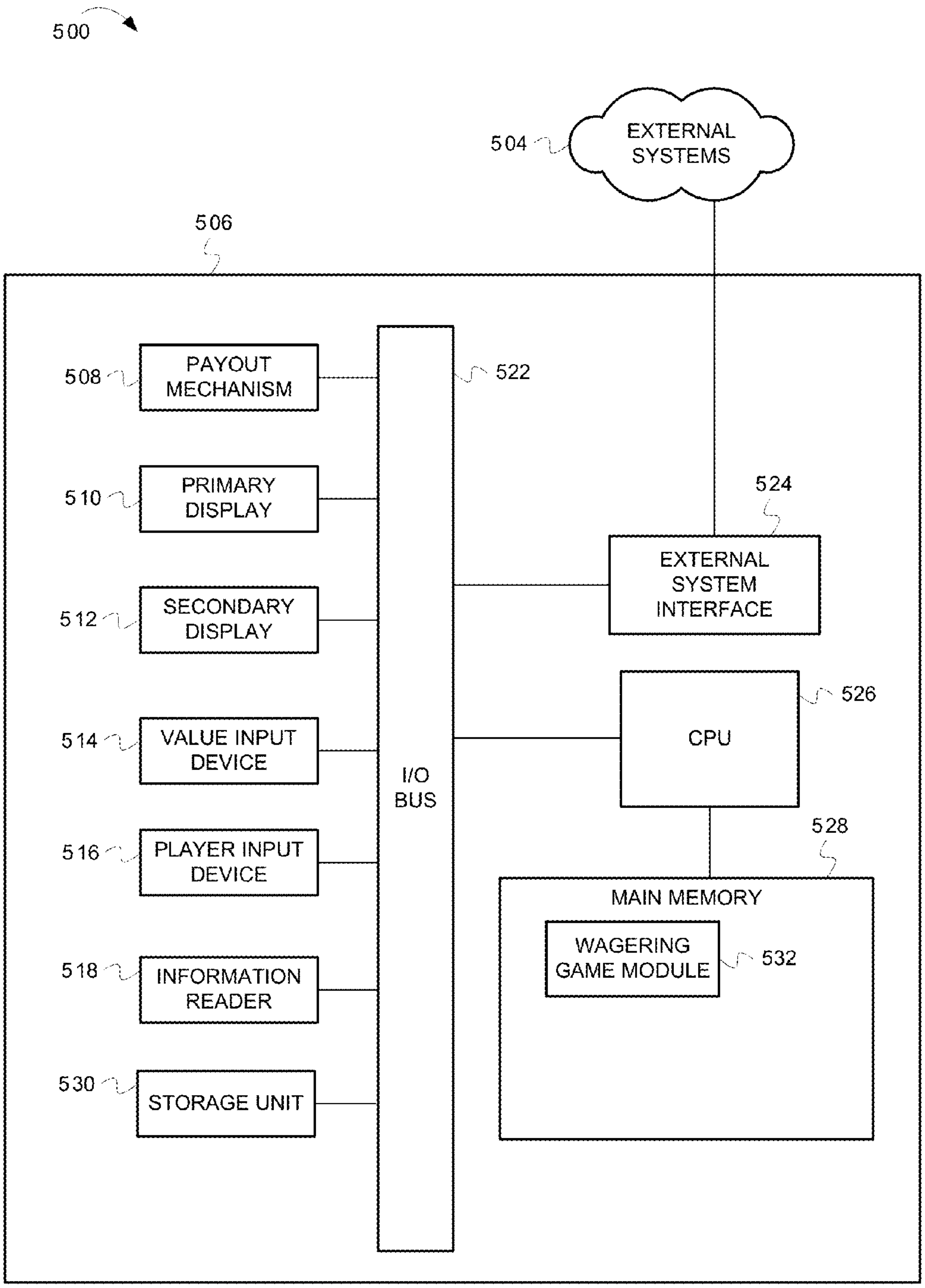
FIG. 5 is a block diagram illustrating a wagering game machine architecture, according to some example embodiments.

FIG. 5 is a block diagram illustrating a wagering game machine architecture, according to some example embodiments. As shown in FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game module 532. In one embodiment, the wagering game module 532 can present wagering games, such as video poker, video black jack, video slots, video lottery, etc., in whole or part. The wagering game module 532 can also send login notifications over the network to the player account module 108 (see description of FIGS. 1-2 above).

The CPU 526 is also connected to an input/output (I/O) bus 522, which can include any suitable bus technologies, such as an AGTL+ frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and/or multiple CPUs 526. In one embodiment, any of the components can be integrated or subdivided.

Any component of the architecture 500 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Wagering Game Networks

Figure 6:
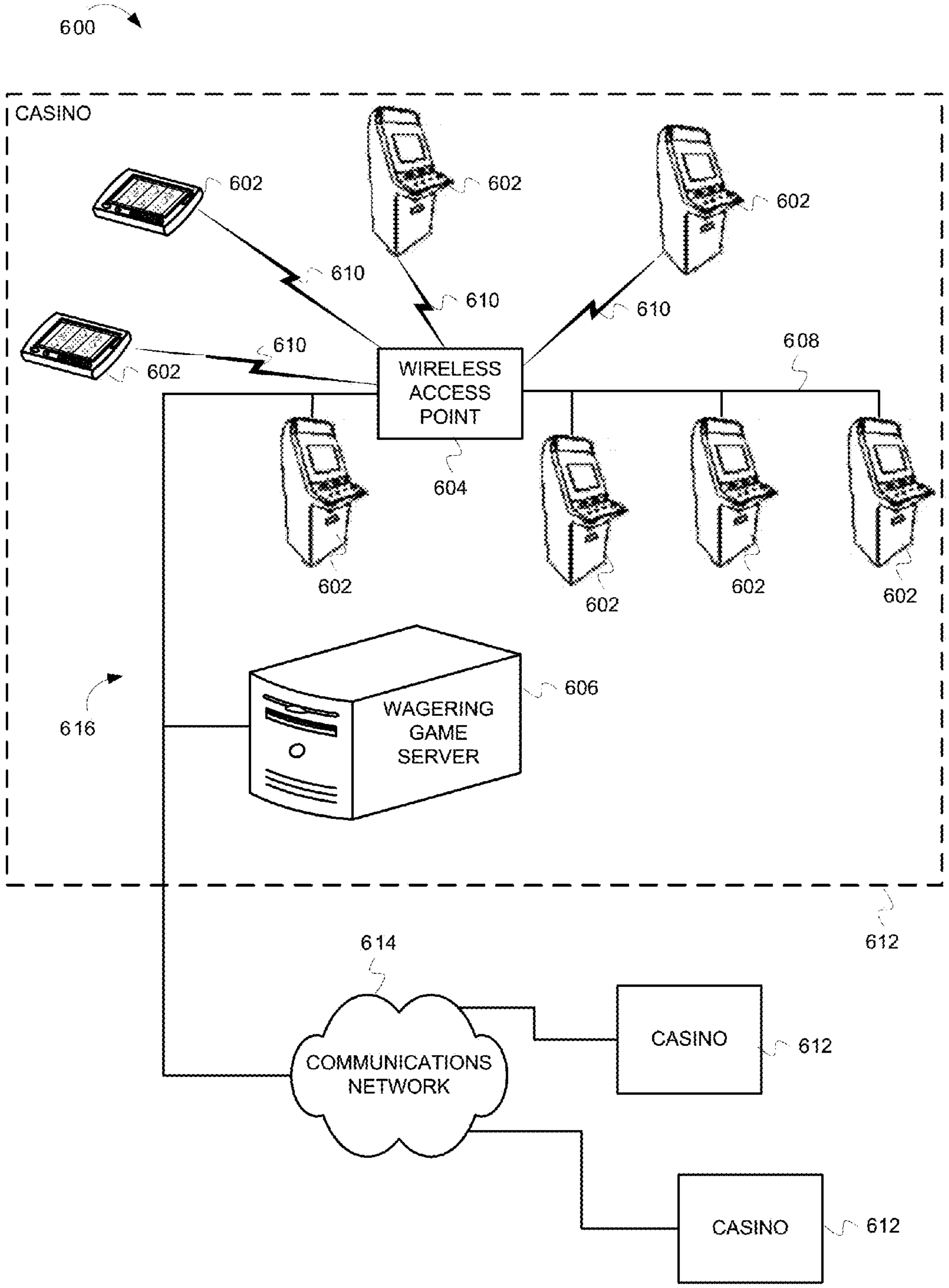
FIG. 6 is a block diagram illustrating a wagering game network 600, according to some example embodiments.

FIG. 6 is a block diagram illustrating a wagering game network 600, according to some example embodiments. As shown in FIG. 6, the wagering game network 600 includes a plurality of casinos 612 connected to a communications network 614.

Each casino 612 includes a local area network 616, which includes an access point 604, a wagering game server 606, and wagering game machines 602. The access point 6304 provides wireless communication links 610 and wired communication links 608. The wired and wireless communication links can employ any suitable connection technology, such as Bluetooth, 802.11, Ethernet, public switched telephone networks, SONET, etc. In some embodiments, the wagering game server 606 can serve wagering games and distribute content to devices located in other casinos 612 or at other locations on the communications network 614. In some example embodiments, the wagering game server 606 can include the player account module 108—see description of FIGS. 1-2 above.

The wagering game machines 602 described herein can take any suitable form, such as floor standing models, handheld mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In some embodiments, wagering game machines 602 and wagering game servers 606 work together such that a wagering game machine 602 can be operated as a thin, thick, or intermediate client. For example, one or more elements of game play may be controlled by the wagering game machine 602 (client) or the wagering game server 606 (server). Game play elements can include executable game code, lookup tables, configuration files, game outcome, audio or visual representations of the game, game assets or the like. In a thin-client example, the wagering game server 606 can perform functions such as determining game outcome or managing assets, while the wagering game machine 602 can present a graphical representation of such outcome or asset modification to the user (e.g., player). In a thick-client example, the wagering game machines 602 can determine game outcomes and communicate the outcomes to the wagering game server 606 for recording or managing a player's account.

In some embodiments, either the wagering game machines 602 (client) or the wagering game server 606 can provide functionality that is not directly related to game play. For example, account transactions and account rules may be managed centrally (e.g., by the wagering game server 606) or locally (e.g., by the wagering game machine 602). Other functionality not directly related to game play may include power management, presentation of advertising, software or firmware updates, system quality or security checks, etc.

Any of the wagering game network components (e.g., the wagering game machines 602) can include hardware and machine-readable media including instructions for performing the operations described herein.

Example Wagering Game Machine

Figure 7:
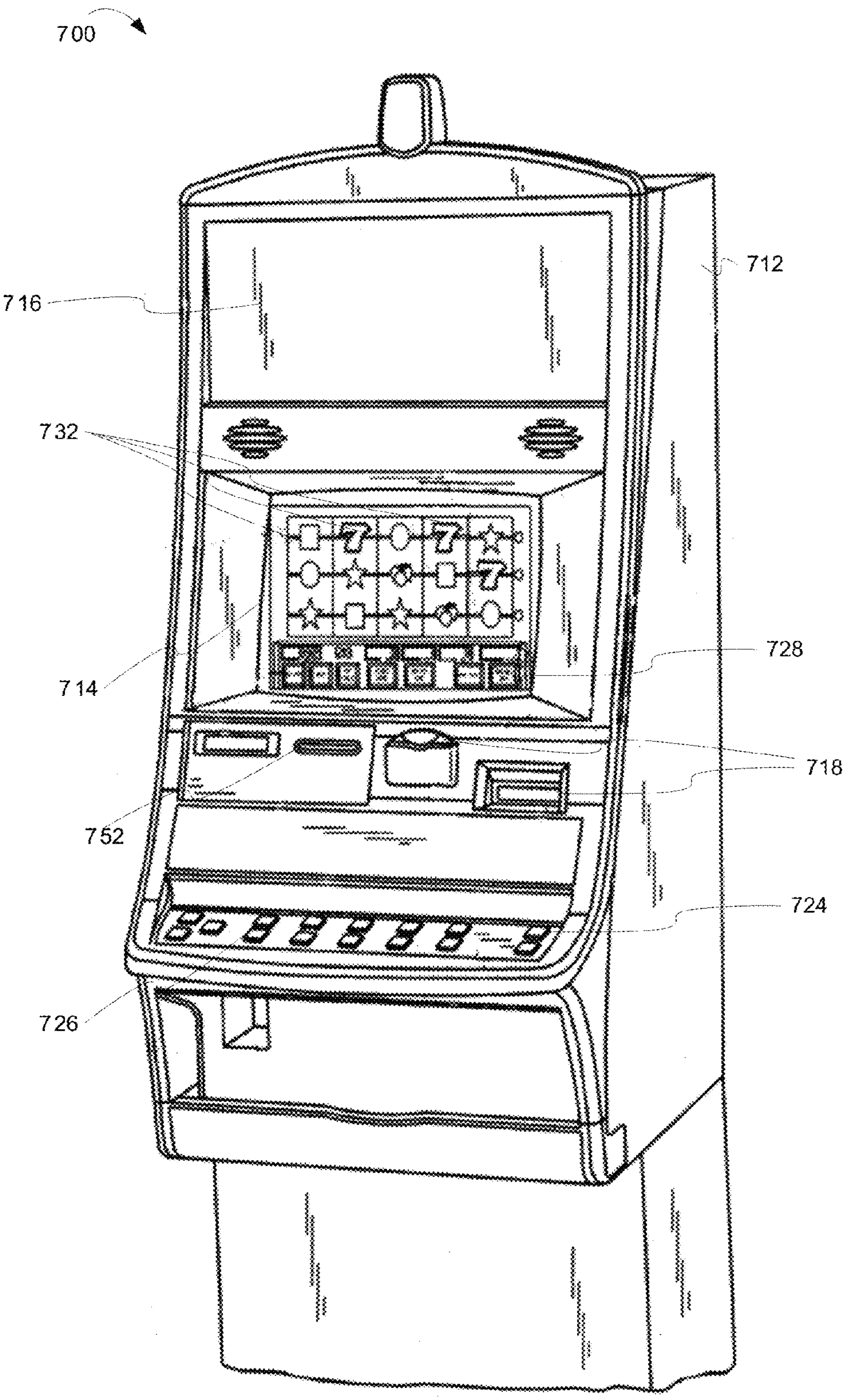
FIG. 7 is a perspective view of a wagering game machine, according to some example embodiments.

FIG. 7 is a perspective view of a wagering game machine, according to some example embodiments. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized method comprising:

creating an event associated with a number of wagering game machines in a wagering game establishment, wherein the event is configured to provide incentives for wagering at the number of wagering game machines, and wherein a wagering game machine of the number of wagering game machines includes a processor, an electronic display device, one or more electronic input devices, and one or more controllers;

identifying persons to notify about the event;

creating an event notification to notify the persons of the event;

outputting the event notification prior to a time of the event, to the persons through a network communication;

initiating the event in response to a defined number of the persons logging into player accounts at the number of wagering game machines;

detecting, via the one or more electronic input devices of the wagering game machine, a physical item associated with a monetary value that establishes a credit balance;

initiating a wagering game associated with the event in response to an input associated with a wager covered by the credit balance; and receiving, via the one or more electronic input devices, a cashout input that initiates a payout from the credit balance.

2. The computerized method of claim 1, further comprising initiating the event after the defined number of persons are logged into the player accounts at the selected number of wagering game machines.

3. The computerized method of claim 1, wherein identifying the persons comprises identifying the persons having a player account and having opted in to receiving the event notification.

4. The computerized method of claim 3, wherein identifying the persons comprises identifying the persons exceeding a threshold for an attribute related to their wagering game play at the wagering game establishment.

5. The computerized method of claim 4, wherein the attribute comprises at least one of:

a monetary amount spent at the wagering game establishment during a first defined time period;

a game level reached on a first type of the number of wagering game machines;

a time spent wagering at the wagering game establishment during a second defined time period; and wagering game play of a second type of wagering game machine.

6. A computerized method comprising:

creating an event associated with a number of wagering game machines in a wagering game establishment, wherein creating the event is in response to inactivity of wagering game play at the number of wagering game machines, and wherein a wagering game machine of the number of wagering game machines includes a processor, an electronic display device, one or more electronic input devices, and one or more controllers;

identifying persons to notify about the event prior to a time of the event;

creating an event notification to notify the persons of the event;

outputting the event notification to the persons through a network communication;

initiating the event;

detecting, via the one or more electronic input devices of the wagering game machine, a physical item associated with a monetary value that establishes a credit balance;

initiating a wagering game associated with the event in response to an input indicative of a wager covered by the credit balance; and receiving, via the one or more electronic input devices, a cashout input that initiates a payout from the credit balance.

7. The computerized method of claim 6, wherein creating the event is in response to the inactivity of the wagering game play at the number of wagering game machines falling above a threshold level for a time period.

8. The computerized method of claim 6, wherein identifying the persons comprises identifying the persons having a player account and having opted in to receiving the event notification.

9. The computerized method of claim 8, wherein identifying the persons having opted in is based on at least one of a time of the event, a type of the award, and a theme type of the number of wagering game machines.

10. The computerized method of claim 6, wherein identifying the persons comprises identifying the persons within a defined geographic range of the wagering game establishment.

11. The computerized method of claim 6, wherein identifying the persons comprises identifying the persons exceeding a threshold for an attribute related to their wagering game play at the wagering game establishment.

12. The computerized method of claim 11, wherein the attribute comprises at least one of:

a monetary amount spent at the wagering game establishment during a defined time period;

a game level reached on a first type of the selected number of wagering game machines;

a time spent wagering at the wagering game establishment during a defined time period; and wagering game play of a second type of wagering game machine.

13. One or more non-transitory machine-readable storage media including instructions which, when executed by one or more processors, cause the one or more processors to perform operations comprising:

create an event associated with a number of wagering game machines in a wagering game establishment, wherein the event is configured to provide incentives for wagering game play at the number of wagering game machines, wherein the event is created in response to inactivity of wagering game play at the number of wagering game machines, and wherein a wagering game machine of the number of wagering game machines includes an electronic display device, one or more electronic input devices, and one or more controllers;

request a first identification of persons within a defined geographic range of the wagering game establishment from a location finder;

receive the first identification in response to the request;

create an event notification to notify the persons of the event;

output the event notification, prior to the time of the event, to the persons through a network communication;

initiating the event in response to a defined number of the persons logging into player accounts at the number of wagering game machines;

detecting, via the one or more electronic input devices of the wagering game machine, a physical item associated with a monetary value that establishes a credit balance;

initiating a wagering game associated with the event in response to an input indicative of a wager covered by the credit balance; and receiving, via the one or more electronic input devices, a cashout input that initiates a payout from the credit balance.

14. The one or more non-transitory machine-readable storage media of claim 13, wherein the operations further comprise:

outputting a second identification of persons having a player account at the wagering game establishment, wherein the first identification identifies persons having a player account at the wagering game establishment.

15. The one or more non-transitory machine-readable storage media of claim 14, wherein the first identification identifies persons having opted in to receiving the event notification.

16. The one or more non-transitory machine-readable storage media of claim 13, wherein the operations comprise:

after receipt of the first identification removing from the first identification the persons not having a player account at the wagering game establishment.

17. The one or more non-transitory machine-readable storage media of claim 16, wherein the operations comprise:

after receipt of the first identification removing from the first identification the persons not having opted in to receiving the event notification.

18. An apparatus comprising:

a processor;

a player account module executable on the processor, the player account module configured to;

create an event associated with a number of wagering game machines in a wagering game establishment, wherein creation of the event is in response to inactivity of wagering game play at the number of wagering game machines, and wherein a wagering game machine of the number of wagering game machines includes an electronic display device, one or more electronic input devices, and one or more controllers configured to:

detect, via the one or more electronic input devices of the wagering game machine, a physical item associated with a monetary value that establishes a credit balance;

initiate a wagering game associated with the event in response to an input indicative of a wager covered by the credit balance; and receive, via the one or more electronic input devices, a cashout input that initiates a payout from the credit balance;

identify persons to notify about the event prior to a time of the event;

create an event notification to notify the persons of the event;

output the event notification to the persons through a network communication; and initiate the event in response to a defined number of the persons logging into player accounts at the number of wagering game machines.

19. The apparatus of claim 18, wherein the player account module is configured to create the event in response to the inactivity of the wagering game play at the number of wagering game machines falling above a threshold level for a time period.

20. The apparatus of claim 18, wherein the player account module is configured to identify the persons having a player account and having opted in to receiving the event notification.

21. The apparatus of claim 20, wherein the player account module is configured to identify the persons having opted in based on at least one of a time of the event, a type of the award, and a theme type of the number of wagering game machines.

22. An apparatus comprising:

means for creating an event associated with a number of wagering game machines in a wagering game establishment, wherein the event is configured to provide incentives for wagering at the number of wagering game machines, and wherein a wagering game machine of the number of wagering game machines includes a processor, an electronic display device, one or more electronic input devices, and one or more controllers;

means for identifying persons to notify about the event;

means for creating an event notification to notify the persons of the event;

means for outputting the event notification, prior to a time of the event, to the persons through a network communication;

initiating the event in response to a defined number of the persons logging into player accounts at the number of wagering game machines;

detecting, via the one or more electronic input devices of the wagering game machine, a physical item associated with a monetary value that establishes a credit balance;

initiating a wagering game associated with the event in response to an input associated with a wager covered by the credit balance; and receiving, via the one or more electronic input devices, a cashout input that initiates a payout from the credit balance.

23. The apparatus of claim 22, further comprising means for initiating the event after the defined number of persons are logged into the player accounts at the number of wagering game machines.

24. The apparatus of claim 22, wherein means for identifying the persons comprises means for identifying the persons having a player account and having opted in to receiving the event notification.

25. The apparatus of claim 24, wherein means for identifying the persons comprises means for identifying the persons exceeding a threshold for an attribute related to their wagering game play at the wagering game establishment, wherein the attribute comprises at least one of:

a monetary amount spent at the wagering game establishment during a defined time period;

a game level reached on a first type of the selected number of wagering game machines;

a time spent wagering at the wagering game establishment during a defined time period; and wagering game play of a second type of wagering game machine.

26. The computerized method of claim 1, wherein the incentives vary among the number of persons according to a monetary amount spent by the number of persons within a time period prior to the event.

27. The computerized method of claim 26, wherein the monetary amount spent within the time period is for at least one of the wagering game establishment and a second number of wagering game machines of a same type as the number of wagering game machines.

28. The computerized method of claim 1, wherein the event offers at least one of a group consisting of better pay tables, a number of free spins, unlocked content, and a jackpot award.

29. The computerized method of claim 1, wherein creating the event is in response to inactivity of wagering game play at the number of wagering game machines.

30. The computerized method of claim 6, wherein the event is initiated in response to a defined number of persons joining the event, wherein the event is configured to provide awards, and wherein the awards vary among the defined number of persons according to a monetary amount spent within a time period prior to the event by the defined number of persons.

31. The one or more non-transitory machine-readable storage media of claim 13, wherein the event provides awards, and wherein the awards vary among the persons in the event according to a monetary amount spent within a time period prior to the event by the persons.

32. The apparatus of claim 18, wherein the event is initiated in response to at least a defined number of persons joining the event, wherein the event provides awards, and wherein the awards vary among the defined number of persons according to a monetary amount spent within a time period prior to the event by the defined number of persons.

33. The apparatus of claim 22, wherein the incentives vary among the number of persons according to a monetary amount spent within a time period prior to the event by the number of persons.

34. The apparatus of claim 33, wherein the monetary amount spent within the time period is for at least one of the wagering game establishment and a second number of wagering game machines of a same type as the number of wagering game machines.

35. The computerized method of claim 22, wherein the means for creating the event create the event in response to inactivity of wagering game play at the number of wagering game machines.

* * * * *